United States Patent [19]

Starkweather et al.

[11] Patent Number: 5,079,563
[45] Date of Patent: Jan. 7, 1992

[54] ERROR REDUCING RASTER SCAN METHOD

[75] Inventors: Gary K. Starkweather, Saratoga; John C. Dalton, San Francisco, both of Calif.

[73] Assignee: Apple Computer, Inc., Cupertino, Calif.

[21] Appl. No.: 483,164

[22] Filed: Feb. 20, 1990

[51] Int. Cl.⁵ .......................................... G01D 15/18
[52] U.S. Cl. ..................................... 346/1.1; 400/121
[58] Field of Search .................. 346/1.1, 75, 140 R; 400/121, 118; 358/296, 293; 101/93.04, 93.05

[56] References Cited

U.S. PATENT DOCUMENTS

| 4,198,642 | 4/1980 | Gamblin | 346/75 |
| 4,232,324 | 1/1980 | Tsao | 346/75 |

Primary Examiner—Benjamin R. Fuller
Assistant Examiner—Alrick Bobb
Attorney, Agent, or Firm—Mark Aaker

[57] ABSTRACT

An error reducing raster scan method for a raster scan device having multiple simultaneous scan lines, the method including the steps of separating scan lines to be placed adjacent to each other into different scan groups, so that no two scan lines to be placed adjacent to each other are in the same scan group, and a scanning a set of scan lines from a different one of the scan groups on each scan across the area.

8 Claims, 4 Drawing Sheets

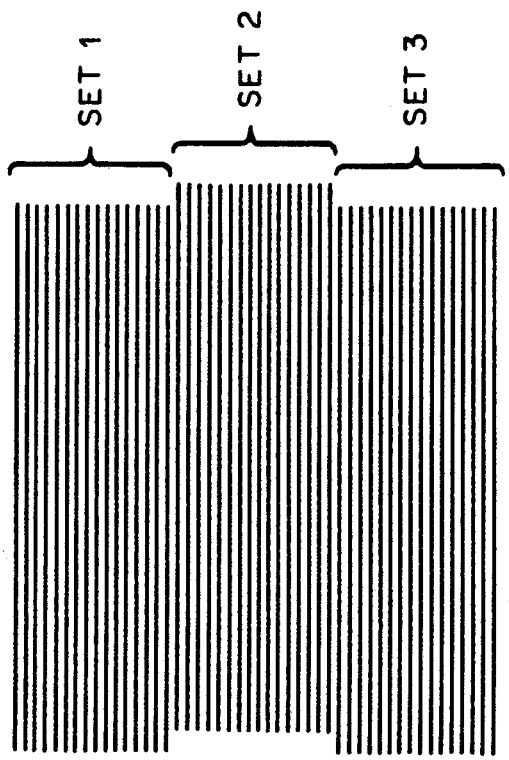
FIG — 1 (PRIOR ART)

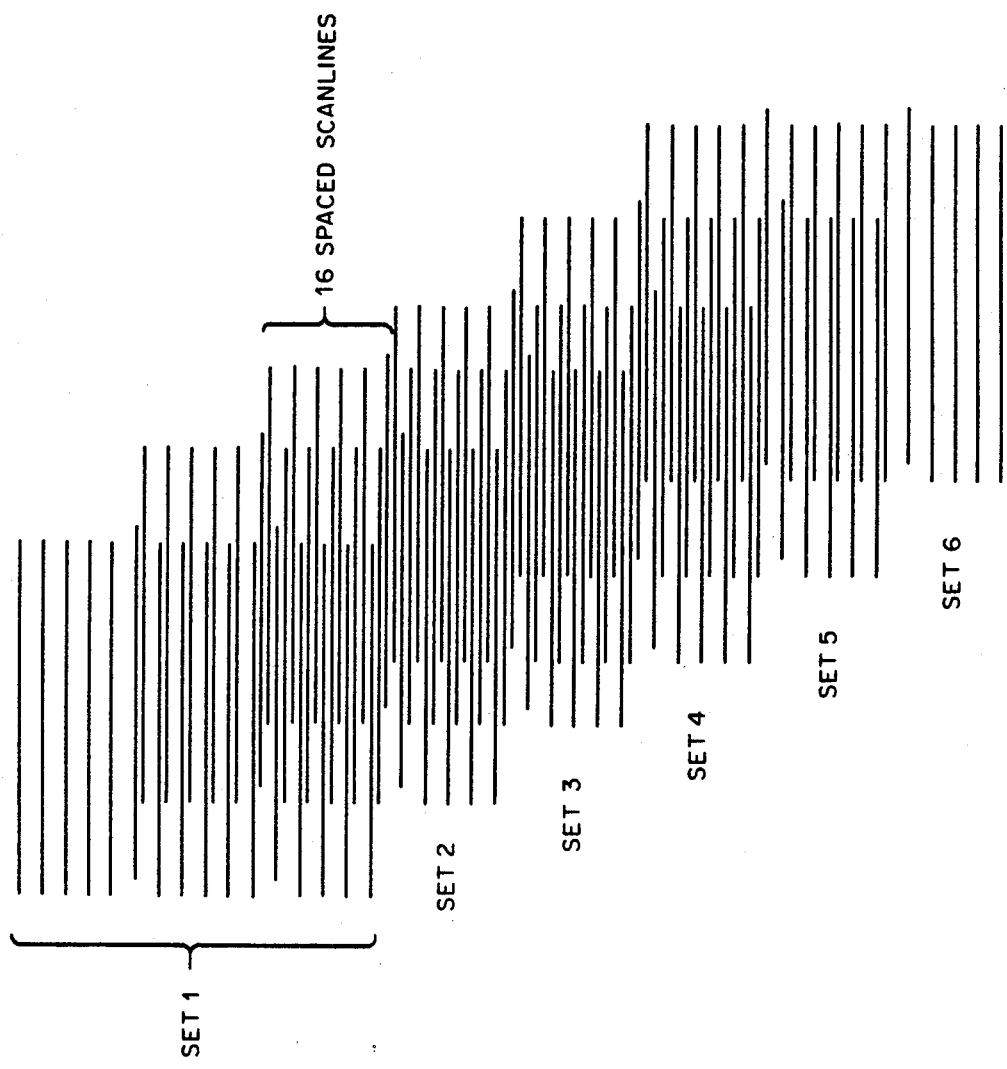

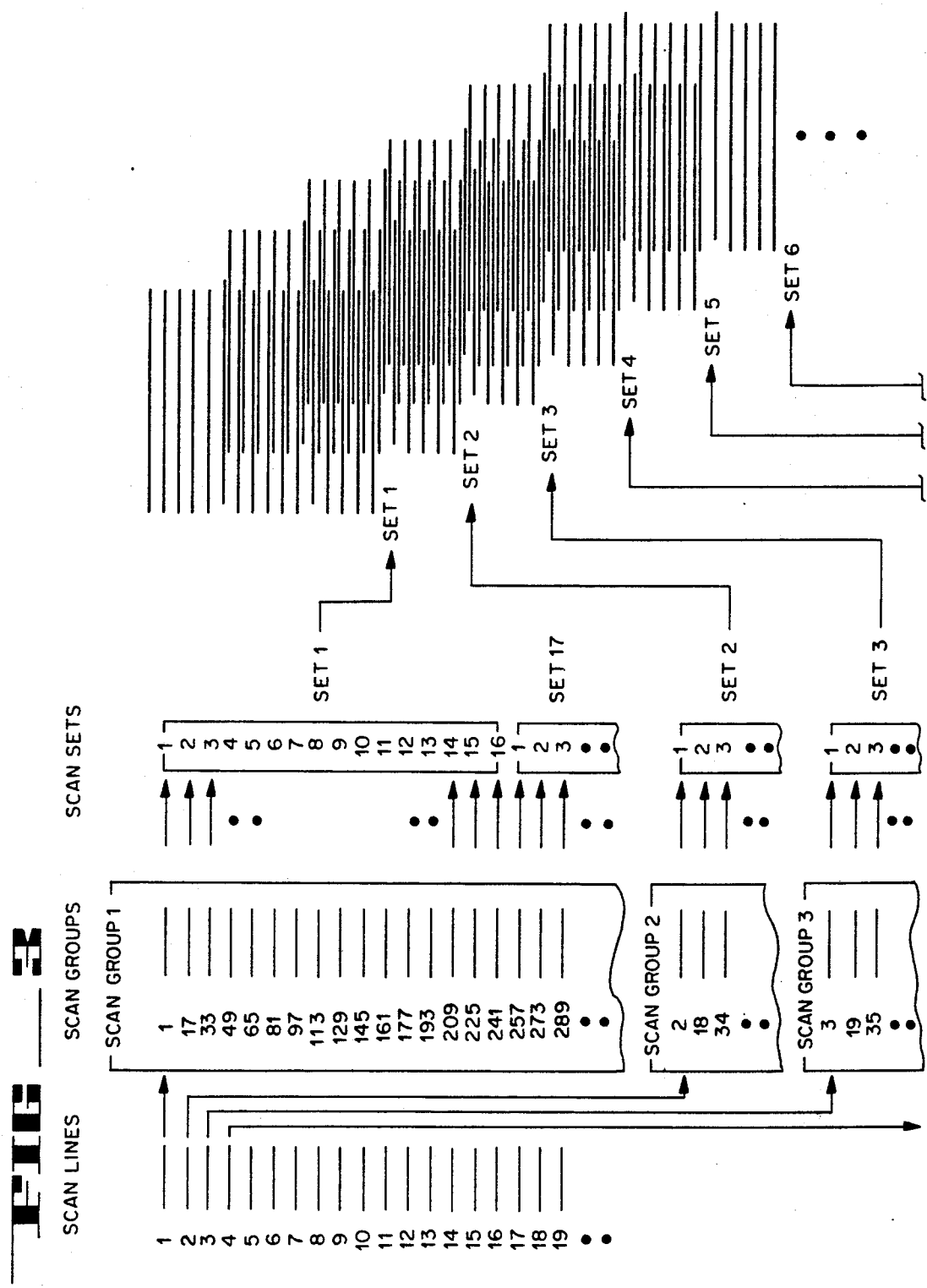

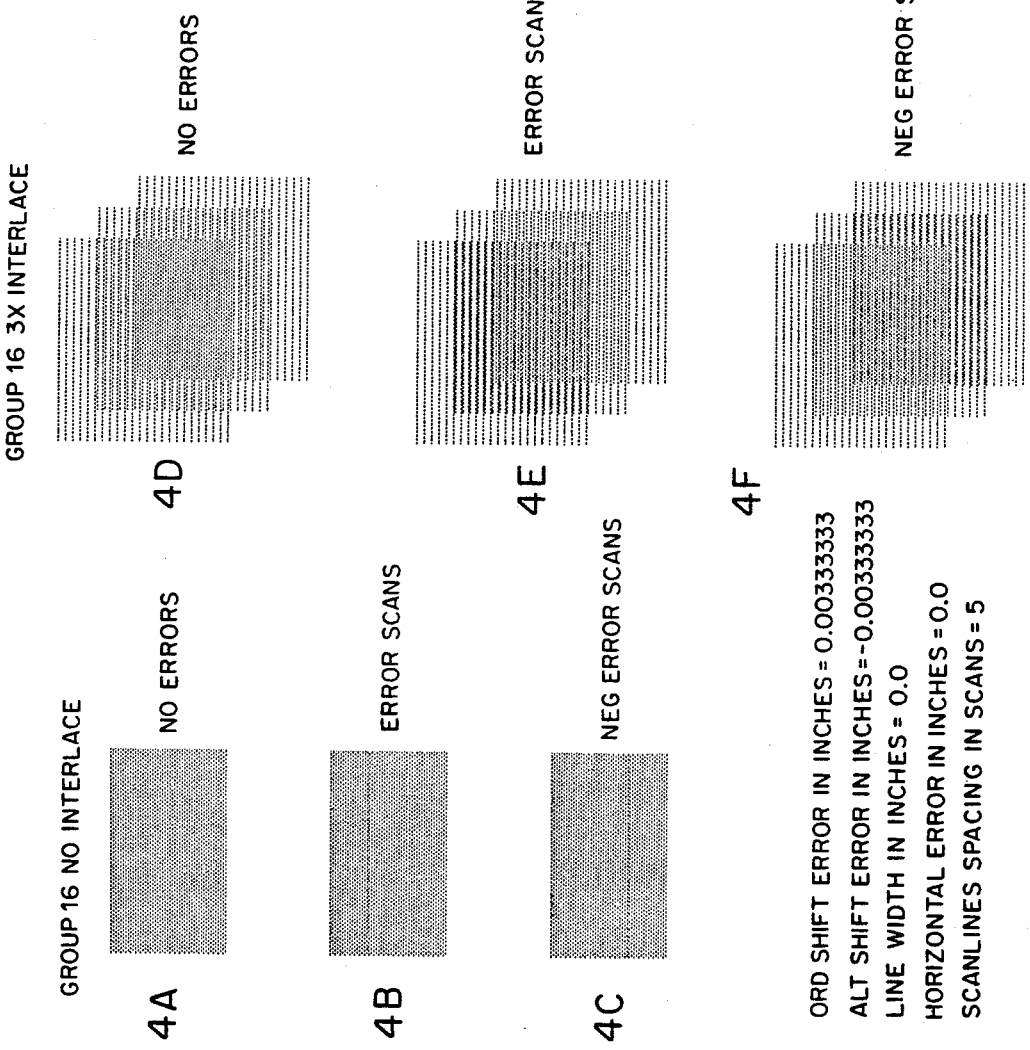

ERROR REDUCING RASTER SCAN METHOD

BACKGROUND OF THE INVENTION

This invention relates to reducing the effect of errors in the positioning of scan lines on an area, such as in the positioning of print lines on a media, or in the scanning of a surface to extract reflection information. This invention can apply to any raster scan device using multiple simultaneous scan lines, such as a printer having multiple printing markers, or a laser scanner having multiple scanning beams.

In the technologies of printing and scanning it is known to scan an area with a raster scan, which can be a predetermined pattern of scan lines, such as a set of closely spaced parallel lines, that provide substantially uniform coverage of an area. In printing, it is known to form a print image from a series of adjacent print lines running down the length of a page. In scanning, it is known to convert continuous tone images into "halftone" images which are discretized along a series of scan lines. It is also known to use multiple printing markers or multiple scanning beams to achieve increased speed of printing or scanning.

The process of dividing up an area by scan lines, and in dividing sets of scan lines among multiple printing markers or multiple scanning beams, causes forms of sampling or quantized error which can directly, or through interaction with other processes, introduce errors in the scanned or printed image at frequencies that fall within the response characteristics of the human eye.

Consider for example, a simple raster scan device, a dot matrix printer with a print head holding nine marking elements, which can print a set of nine print lines across a page during each scan. After each scan, the print head is repositioned nine lines lower on the page, to print the next set of nine print lines. Ideally, the next set of print lines would begin exactly one line spacing below the previous set of print lines.

Errors in the spacing between sets of print lines can be quite noticeable and objectionable. For example, if the print head moves too far down the page, the sets are placed too far apart, and a bare unmarked strip can appear which might appear as a bright line across a dark background. Conversely, if the print head moves too little down the page, the sets are placed too close together, and an overlapped, double-printed strip can appear, which might appear as a dark line across a light background.

These, and similar types of boundary errors, can occur whenever the raster scan is built up from smaller sets of scan lines, or when the scan lines are divided among multiple markers or scanning beams. Proper spacing between sets of scan lines is needed to prevent these errors. In printing, these errors appear as visual defects in the printed image. In scanning, these errors reduce the accuracy of the scanned information as gaps or overlaps can occur.

Exacerbating these errors is the fact that they will often occur at frequencies at which the human eye is highly sensitive. For example, in known types of printers, with sets of 9 to 24 markers in the print head and for print densities and resolutions of 100 to 600 lines per inch, the spacing of these types of errors will usually fall at frequencies to which the human eye is quite sensitive, for example, roughly around one millimeter intervals. Of course, the frequency of these errors will vary depending on the number of multiple markers, marker spacing, and print density. The severity of these errors will vary depending on the type of marking technology, mechanical constraints on print head movement, and the precision and rigidity of mechanical construction and operation.

It is difficult to reduce these errors by increasing the precision of scan line positioning, for example, by finer positioning of the print head. Experiments have shown that the precision of print head positioning required for acceptable visual results is on the order of one-eighth of one print line spacing or better. This can be difficult and expensive to achieve, and difficult to maintain over the working life of a printer.

It is also difficult to reduce these errors by changing the spacing of the errors, for example, by printing in smaller or larger sets of print lines. Printing with a smaller set of print lines from a smaller print head would be quite slow since it would require many more passes to complete a full page image. Printing with a larger set of print lines from a larger print head reduces the number of times the error appears on a page, but does not reduce the visual contrast of any single error.

SUMMARY OF THE INVENTION

This invention provides a simple, low precision, and low cost method of reducing the effect of errors in the positioning of scan lines on an area. For a raster scan device having multiple simultaneous scan lines, a method in accordance with this invention includes the steps of separating scan lines to be placed adjacent to each other into different scan groups, so that no two scan lines to be placed adjacent to each other are in the same scan group; and scanning a set of scan lines from a different one of the scan groups on each scan across the area. An error reducing raster scan apparatus has a means to separate scan lines into different scan groups, and a means for scanning a set of scan lines from a different one of the scan groups on each scan of the multiple simultaneous scan lines across the area. In this way, the border between sets of scan lines has been distributed into the interlace of many scan lines, reducing the effect of errors in spacing between the sets of scan lines.

BRIEF DESCRIPTION OF THE DRAWINGS

FIG. 1 illustrates the positioning scan lines on an area by a known method.

FIG. 2 illustrates the positioning of scan lines on an area by an error reducing raster scan method in accordance with this invention.

FIG. 3 illustrates the steps of an error reducing raster scan method in accordance with this invention.

FIG. 4 illustrates the difference in visual results from errors in print head positioning in non-interlace printing and in a three line interlace printing method in accordance with this invention.

DETAILED DESCRIPTION OF THE INVENTION

FIG. 1 illustrates the positioning of scan lines on an area as might be done by a known method. In this illustration, three sets of scan lines are shown, each enlarged and offset horizontally from each other for clarity. Each set is 16 adjacent scan lines. Each set can be placed on the scan area in one scan by a raster scan device using 16 simultaneous markers or scanning beams. FIG. 1 could illustrate for example, sets of print lines from a print head having 16 printing markers for printing 16 simultaneous print lines across a page per scan.

A known method of generating the scan lines of FIG. 1 would include producing the sets of scan lines in a sequential manner. For example, in a printer with a 16 marker print head, after the printing of the 16 lines in Set 1, the print head is repositioned 16 lines lower on the page in order to print Set 2. After printing the 16 lines in Set 2 the print head is repositioned 16 lines lower on the page to print Set 3. Precise positioning of the print head is required so that the spacing between sets is as fine as the spacing between any print lines, for example, 1/300 of an inch. Any error in positioning the print head from Set 1 to Set 2 can result in a visual defect between Set 1 to Set 2. Any error in positioning the print head from Set 2 to Set 3 can result in a visual defect between Set 2 to Set 3. These same principles and error conditions occur for other raster scan devices using sets of multiple scan lines to cover an area.

FIG. 2 illustrates the positioning of scan lines on an area by an error reducing raster scan method in accordance with this invention. In this illustration, six sets of scan lines are shown, each enlarged and offset horizontally from each other for clarity.

In FIG. 2, each set is 16 spaced scan lines. In the embodiment illustrated in FIG. 2, the scan lines are spaced from each other by an interlace distance of three scan lines. Each set can be placed on the scan area by a raster scan device using 16 spaced simultaneous printing markers or scanning beams. FIG. 2 could illustrate for example, sets of print lines from a print head having 16 printing markers for printing 16 simultaneous print lines across a page per scan.

The sets of scan lines are interlaced, by placing a second and third scan line into the interlace distance between two scan lines of the first set. However, in the embodiment illustrated, the interlace does not begin immediately in the first space after the first line of the first set, but instead, the following sets of scan lines to be interlaced are positioned a step distance of 16 lines further down the area.

The raster scan of FIG. 2 can be described as a three line interlace of scan lines. That is, for coverage of an area at a resolution of 1/300 of an inch, each set of scan lines is spaced 1/100 of an inch apart during a scan, and three sets of scans lines across the area are interlaced to achieve complete, uniform coverage of the area.

In a printer having the three line interlace as illustrated in FIG. 2, the 16 printing markers within the print head would be separated from each other by the interlace distance of three line spacings. This implies that the print head is of a larger size or span, since it must now be three times taller than previously where the markers produced adjacent lines. However, spaced markers are much easier to manufacture than adjacent markers, and so in practice the taller print head with wider spacing between markers is an advantage of this new invention.

Preferred results for reducing the effect of errors in positioning of the scan lines can be obtained when the number of simultaneous scanning beams and the number of lines of interlace spacing have no integer common factor greater than one. For example, FIG. 2 illustrates an embodiment of 16 scan lines with a 3 line interlace. A second suitable embodiment might have 16 scan lines with a 5 line interlace. By contrast, an embodiment of 16 scan lines with a 6 line interlace would have a common factor of 2 and produce less improved results. Also, an odd numbered size of interlace is preferred to avoid even divisions of areas, which provide less reduction of the visual effects of errors in the positioning of the scan lines.

FIG. 3 illustrates the steps of an error reducing raster scan method in accordance with this invention, for example to produce the raster scan lines on a scan area as shown in FIG. 2. Moving across FIG. 3 from left to right, scan lines to be placed adjacent to each other on an area are separated into different scan groups, so that no two adjacent lines are in the same scan group. Preferably, the number of scan groups matches the number of simultaneous printing markers or scanning beams to be used. The embodiment illustrated in FIG. 3 would have 16 scan groups. As scan lines are allocated to different scan groups, when the end of the scan groups is reached, allocation begins again at the first scan group. Therefore, scan group 1 will have scan lines 1, 17, 33, and the following lines to be placed each 16 lines further down the area. These scan lines can be output lines or input lines, that is they can be print lines to be printed by a printer, or can be scan lines for which input information will be obtained during the scan. This separation of scan lines could be accomplished by the raster scan device itself, by a controller and buffer memory within or outside the raster scan device, or by a computer or data processing unit attached to the raster scan device.

From a scan group, a set of 16 scan lines is selected for scanning over the scan area by the 16 simultaneous print markers or scanning beams. One scan line from the scan group is selected for each of the printing markers or scanning beams of the raster scan device. For example, a set of 16 scan lines is selected from scan group 1 to provide 16 lines to be scanned across the area as set 1.

For the next scan, a new set of 16 scan lines from the next one of the scan groups is selected. For example, a set of 16 scan lines is selected from scan group 2 for scanning across the area as set 2. When a set of scan lines has been selected from each scan group, selection begins again with the first scan group, and selects the next set of 16 lines from within that scan group.

In FIG. 2 or FIG. 3, the scan platform or print head progresses down the area a step distance of 16 lines between each set of scan lines. In a printer, this would correspond to stepping the print head down the page 16 lines between each scan across the page. It is preferred to select a number of scan lines, interlace distance, and step size that provides complete coverage of the scan area with a series of equal uniform steps, since It is easier and less costly to build a mechanism to provide equal uniform steps than to build a mechanism to provide precise multiple step sizes. However, this preferred method of uniform steps results in the area on the page is not completely filled in until the third set of scan lines are scanned, beginning at line 33. To achieve printing from the very first line at the top of the page, the print head is initially positioned to print beginning 33 lines above the first line desired on the page, and printing is suppressed in the upper 10 markers of the first set, and during the upper 5 markers of the second set. Then, on the third pass, and on all subsequent passes, the area is completely filled as the scans proceed down the page. By suppressing the printing during these first two passes, the remainder of the page can be filled in with a uniform step size and simplified stepping. In practice, the penalty for using less than the full capability of the print head for these first two scans is quite small compared to the advantage it brings in allowing a uniform step size.

Similarly at the bottom of the page, printing in the bottom markers of the print head is suppressed for the last two passes of the print head. Again, this penalty is small. For comparison, while 4 scans (2 at the top, and 2 at the bottom of the page) are less than fully utilized, over 200 scans are needed to fill the whole page with a 16 marker print head and 300 line per inch resolution on an 11 inch page.

The steps to use the method of this invention for printing a print image of adjacent print lines down the length of a page by a printer having multiple printing markers for simultaneously printing multiple print lines across the page would include:

1. allocating into a first print group a first print line to be printed on the page;
2. allocating into a second print group a second print line to be printed adjacent to the first print line;
3. allocating into a third print group a third print line to be printed adjacent to the second print line;
4. selecting a number of lines from the first print group equal to the number of the printing markers;
5. printing that number of lines from the first print group onto the page;
6. selecting a number of lines from the second print group equal to the number of the printing markers;
7. printing that number of lines from the second print group onto the page, a line of the second print group being printed adjacent to a line from the first print group;
8. selecting a number of lines from the third print group equal to the number of the printing markers; and
9. printing that number of lines from the third print group onto the page, a line of the third print group being printed adjacent to a line from the second print group.

In this way, adjacent print lines on the page are printed in separate printing scans of the print head, rather than printing such adjacent lines simultaneously in one pass. The print lines of one selected set of lines are interlaced with the lines of preceding and following selected sets. As a result, there is not a single border to be matched between adjacent sets of lines, and errors in positioning the print head from set to set have less visual effect.

It should be noted that in this invention, any error in the positioning of the scan lines from set to set is now distributed into the spacings between several interlaced sets of scan lines. Any spacing defect is no longer concentrated at one single boundary. This reduces the visual effect of the errors. The spatial frequency of the error bands has been increased, making them less objectionable. Errors in print head positioning might now appear as different mottling patterns on gray or black backgrounds, but the errors no longer highlight themselves as concentrated bright or dark lines.

This invention can reduce the tolerances on positioning of a print head or on a paper advance system in a printer, and make the system more tolerant of changes in mechanical positioning during the life of the printer, providing a graceful degradation of print quality as the positioning errors increase. For example, a current specification might require a positioning accuracy of one-eighth of one line spacing at 300 lines per inch. This is a very precise requirement that may be very costly to achieve. With the interlace method of this invention, errors up to almost one full line spacing at 300 lines per inch can still be tolerated as visually acceptable. This can substantially reduce the cost and increase the usable lifetime of the printer.

The error reducing raster scan method of this invention can also be used in the positioning of scan lines from a scanner having multiple scanning beams. A scanning method in accordance with this invention would include separating scan lines to be placed adjacent to each other on an area into different scan groups, such that no two scan lines to be placed adjacent to each other are in the same scan group; and scanning a set of scan lines from a different one of the scan groups on each scan of the multiple scanning beams across the area. In this way, the scan lines of one set are interlaced with the scan lines of preceding and following sets. As a result, there is not a single border to be matched between adjacent sets of lines, and the impact of errors in matching those borders are reduced.

FIG. 4 illustrates the difference in visual results from errors in print head positioning in non-interlace printing and in a three line interlace printing method in accordance with this invention.

FIG. 4A shows a block of lines printed by a known method from three sets of 16 lines each with no positioning errors between sets of lines. In this FIGURE, a uniform stipple pattern to produce a gray shade has been printed.

FIG. 4B shows a block of lines printed by a known method from three sets of 16 lines each with an upward shift error in the positioning between sets. It can be seen that the positioning error creates objectionable visual defects of a dark line where the lines overlap, and a white line where the lines are over-separated.

FIG. 4C shows a block of lines printed by a known method from three sets of 16 lines each with a downward shift error in the positioning between sets. It can be seen that the positioning error creates objectionable visual defects of a white line where the lines are over-separated, and a dark line where the lines overlap.

FIG. 4D shows a block of lines printed in accordance with this invention from three sets of 16 lines each with a three line interlace and no positioning errors between sets. Again, a uniform stipple pattern to produce a gray shade has been printed. The three sets of lines have been offset for clarity, with the resulting filled print area appearing only in the center where the three sets overlap.

FIG. 4E shows a block of lines printed in accordance with this invention from three sets of 16 lines each with a three line interlace and with the same upward shift error in the positioning between sets as in FIG. 4B. It can be seen that the positioning error creates much less objectionable visual defects of a finely lined variation in the gray shade. Note that distinctive bright or dark line defects are avoided. The pattern produced can still be visually merged and perceived as a gray shade.

FIG. 4F shows a block of lines printed in accordance with this invention from three sets of 16 lines each with a three line interlace and the same downward shift error in the positioning between sets as in FIG. 4C. It can be seen that the positioning error creates much less objectionable visual defects of a finely lined variation in the gray shade. Note that distinctive bright or dark line defects are avoided. The pattern produced can still be visually merged and perceived as a gray shade.

This invention can be applicable to many types of scanning and printing devices. For example, it can be used in any printers which use scan line printing, such as dot matrix, ink jet, or laser printing where lines are scanned onto a photosensitive surface for later transfer onto a page. It can be used in scanners using multiple light sources or divided light sources to obtain multiple scanning beams.

An error reducing raster scan apparatus with multiple simultaneous scan lines in accordance with this invention would have a means for separating scan lines to be placed adjacent to each other on the area into different scan groups, such that no two scan lines to be placed adjacent to each other are in the same scan group; and would have a means for scanning a set of scan lines from a different one of the scan groups on each scan of the multiple simultaneous scan lines across the area.

The means for separating scan lines could be a set of three scan group buffer memories for holding scan lines to be placed adjacent to each other on the area.

The means for scanning could be a scanning head having a set of scan line positions equal to the number of multiple simultaneous scan lines, with the scan line positions separated from each other by a number of scan line spacings equal to the number of scan groups.

The above and other embodiments can be practiced without departing from the true scope and spirit of the invention, which is defined by the following claims.

What is claimed is:

1. An error reducing print method for printing a print image of adjacent print lines on a page by a printer having a first number of printing markers for simultaneously printing multiple print lines across said page, said method reducing a visual effect of errors in positioning of said printing markers on said page; said method comprising the steps of:
   separating print lines to be printed adjacent to each other on said page into different print groups by sequentially allocating print lines to be printed adjacent to each other on said page into a second number of at least three print groups, such that no two print lines to be printed adjacent to each other are in a same print group; and printing a print set of print lines from a different one of said print groups on each printing of multiple print lines across said page by said printing markers, said print set of each print group having a number of lines equal to said first number of said printing markers, and said print lines being printed by said markers being separated from each other by a number of line spacings equal to said second number of said print groups.

2. An error reducing print method for printing a print image of adjacent print lines on a page by a printer having a first number of printing markers for simultaneously printing multiple print lines across said page, said method reducing a visual effect of errors in positioning of said printing markers on said page; said method comprising the steps of:
   allocating into a first print group a first print line to be printed on said page;
   allocating into a second print group a second print line to be printed adjacent to said first print line;
   allocating into a third print group a third print line to be printed adjacent to said second print line;
   selecting a first print set of a number of lines from said first print group equal to said first number of said printing markers;
   printing said first print set of a number of lines from said first print group onto said page;
   selecting a second print set of a number of lines from said second print group equal to said first number of said printing markers;
   printing said second print set of a number of lines from said second print group onto said page, a line of said second group being printed adjacent to a line from said first print group;
   selecting a third print set of a number of lines from said third print group equal to said first number of said printing markers; and
   printing said third print set of a number of lines from said third print group onto said page, a line from said third group being printed adjacent to a line from said second print group.

3. An error reducing print method for a printing a series of adjacent print lines on a page by a printer having a print head of multiple printing markers for printing multiple print lines simultaneously, said method reducing a visual effect of errors in positioning of said multiple printing markers on said page; said method comprising the steps of:
   generating print line information for at least three adjacent print lines;
   separating said lines into at least three print groups such that adjacent print lines are in separate print groups;
   printing a first print set of print lines from a first of said print groups by passing said print head across said page, with said multiple markers printing multiple print lines from within said first print group;
   positioning said print head to a new position over said page;
   printing a second print set of print lines from a second of said print groups; and
   continuing to position said print head to a new position over said page and printing a print set of print lines from a next print group until completion of print lines for said page.

4. An error reducing print method for printing a series of adjacent print lines on a page by a printer having a print head of multiple printing markers, said method reducing a visual effect of errors in positioning of said multiple printing markers on said page; said method comprising the steps of:
   generating print line information for at least a first print line, a second print line generated to appear on said page adjacent to said first print line, and a third print line generated to appear on said page adjacent to said second print line;
   separating said print line information into a number of print groups by separating said first print line information into a first print group, separating said second print line information into a second print group separate from said first print group, and separating said third print line information into a third print group separate from said first and second print groups;
   printing said print groups on separate passes of said print head across said page, said print line information within a group being printed by said multiple markers within said print head, and said multiple markers positioned within said print head to print said lines spaced from each other by said number of print groups, said print head moving to a new position on said page between printing each group.

5. An error reducing raster scan method for obtaining a scan image from adjacent scan lines positioned on an area by a scanner having a first number of scanning beams for simultaneously scanning multiple scan lines across said area, said method reducing a visual effect of errors in positioning of said scanning beams on said area; said method comprising the steps of:

separating scan lines to be placed adjacent to each other on said area into a second number of different scan groups, such that no two scan lines to be placed adjacent to each other are in the same scan group; and scanning a scan set of scan lines from a different one of said scan groups on each scan of said scanning beams across said area.

6. An error reducing raster scan method as in claim 5 wherein said step of separating comprises sequentially allocating scan lines to be placed adjacent to each other on said area into at least three scan groups.

7. An error reducing raster scan method as in claim 5 wherein said step of scanning comprises:

scanning a scan set of scan lines from each said scan group, each said scan set having a number of scan lines equal to said first number of scanning beams, and said set of scan lines being scanned by said scanning beams being separated from each other by a number of scan line spacings equal to said second number of said scan groups.

8. An error reducing raster scan method for obtaining a scan image from adjacent scan lines positioned on an area by a scanner having a first number of scanning beams for simultaneously scanning multiple scan lines across said area, said method reducing a visual effect of errors in positioning of said scanning beams on said area; said method comprising the steps of:

allocating into a first scan group a first scan line to be placed on said area;

allocating into a second scan group a second scan line to be placed adjacent to said first scan line;

allocating into a third scan group a third scan line to be placed adjacent to said second scan line;

selecting a first scan set of a number of scan lines from said first scan group equal to said first number of scanning beams;

scanning said first scan set of a number of scan lines from said first scan group across said area;

selecting a second scan set of a number of scan lines from said second scan group equal to said first number of scanning beams;

scanning said second scan set of a number of scan lines from said second scan group across said area, a scan line from said second group being placed adjacent to a scan line from said first scan group;

selecting a third scan set of a number of scan lines from said third scan group equal to said first number of scanning beams; and scanning said third scan set of a number of scan lines from said third scan group across said area, a scan line from said third group being placed adjacent to a scan line from said second scan group.

* * * * *